United States Patent [19]

Steinmann

[11] Patent Number: 4,987,354
[45] Date of Patent: Jan. 22, 1991

[54] DEVICE FOR RAIN-INDUCED SWITCHING ON AND OFF OF AN ELECTRIC WINDSCREEN WIPER MOTOR

[75] Inventor: Helmut Steinmann, Baden-Baden, Fed. Rep. of Germany

[73] Assignee: Roberts Bosch GmbH, Stuttgart, Fed. Rep. of Germany

[21] Appl. No.: 457,761
[22] PCT Filed: Jun. 23, 1988
[86] PCT No.: PCT/DE88/00374
§ 371 Date: Jan. 3, 1990
§ 102(e) Date: Jan. 3, 1990
[87] PCT Pub. No.: WO89/00119
PCT Pub. Date: Jan. 12, 1989

[30] Foreign Application Priority Data
Jul. 8, 1987 [DE] Fed. Rep. of Germany ....... 3722510

[51] Int. Cl.$^5$ ............................................. B60S 1/08
[52] U.S. Cl. ................... 318/444; 318/DIG. 2; 15/250 C
[58] Field of Search ......... 318/443, 444, 483, DIG. 2; 15/250 C

[56] References Cited
U.S. PATENT DOCUMENTS

| | | | |
|---|---|---|---|
| 3,826,979 | 7/1974 | Steinmann | 318/483 X |
| 4,355,271 | 10/1982 | Noack | 318/DIG. 2 X |
| 4,495,452 | 1/1985 | Boegh-Peterson | 15/250 C X |
| 4,527,105 | 7/1985 | Shiraishi | 318/444 |
| 4,595,866 | 6/1986 | Fukatsu et al. | 15/250 C X |
| 4,613,802 | 9/1986 | Kraus et al. | 318/443 X |
| 4,665,351 | 5/1987 | Nyberg | 318/483 |
| 4,689,536 | 8/1987 | Iyoda | 15/250 C X |
| 4,703,237 | 10/1987 | Hochstein | 318/DIG. 2 X |

FOREIGN PATENT DOCUMENTS

| | | | |
|---|---|---|---|
| 2645391 | 4/1978 | Fed. Rep. of Germany | 15/250 C |
| 63-53152 | 3/1988 | Japan | 15/250 C |

Primary Examiner—Bentsu Ro
Attorney, Agent, or Firm—Michael J. Striker

[57] ABSTRACT

A device for rain-induced switching on and off of an electric windshield wiper motor (10) in vehicles, is provided with a sensor (18) responding to moisture on the windshield and a control unit (16) for controlling an electric switch (11) for the switching on and off of the windshield wiper motor (10) as a function of the sensor signal. The control unit (17) is constructed in such a way that it detects the rate of variation of the sensor signal and only generates a switch-on signal when there is an increase in amplitude of the sensor signal above a predetermined amplitude magnitude in order to ensure the prompt switching off of the windshield wiper motor (10) when the rain ceases regardless of the formation of streaks on the windshield.

3 Claims, 1 Drawing Sheet

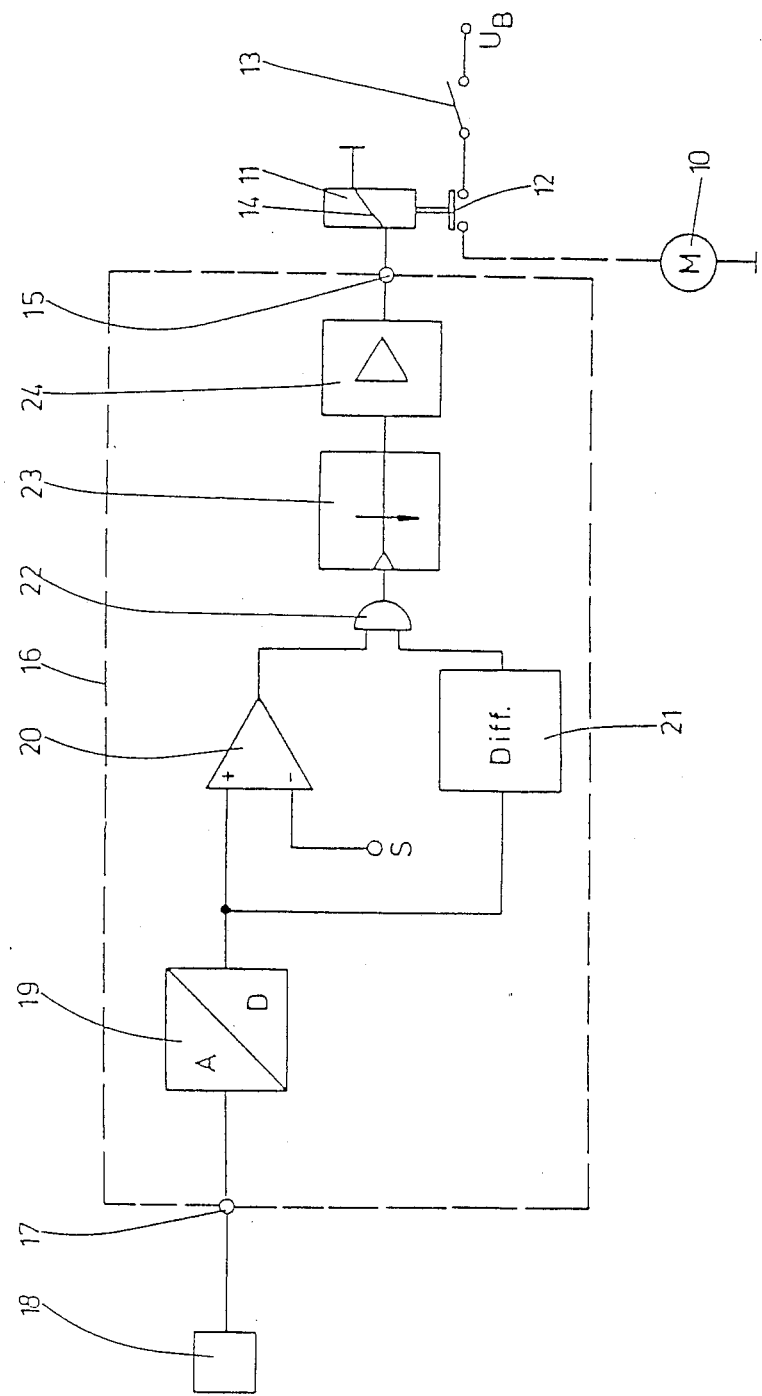

DEVICE FOR RAIN-INDUCED SWITCHING ON AND OFF OF AN ELECTRIC WINDSCREEN WIPER MOTOR

BACKGROUND OF THE INVENTION

The invention is based on a device for rain-induced switching on and off of an electric windshield wiper motor in vehicles.

In a known switching device of this type (DE-OS 22 39 359) the so-called rain sensor is constructed as a capacitive detector. Three electrodes are arranged on the inside of the windshield in the wiping area of the wiping blades. Two electrodes are connected to an alternating voltage and constitute a capacitor, so that an electric field is formed between them. The third electrode is arranged in such a way that only a small stray field of the electric field reaches it when the windshield is dry. The sensor signal is taken off at the third electrode and applied to an adder, to which the alternating voltage is fed so as to be out of phase by 180°. The amplitude of the alternating voltage is dimensioned in such a way that the resultant output signal of the adder is zero when the windshield is dry.

The glass usually used to produce the windshields has a dielectric constant $\epsilon$ in the order of magnitude of 8. The moisture forming on the windshield during rain (water has a dielectric constant of $\epsilon \approx 80$) changes the configuration of the lines of flux between the two capacitor electrodes in such a way that a large field component reaches the third, so-called measuring electrode. The signal amplitude of the sensor signal accordingly increases sharply. An output signal which reaches the switch for the windshield wiper motor as a closing signal occurs at the adder. The wiper motor is switched on. When the windshield is dry again, the output signal of the adder is absent and the wiper motor is switched off.

This known switching device has the problem that the rain sensor cannot distinguish between rain and water streaks which can remain on the windshield during wiping under certain circumstances. As a result of this, the wiper is often turned off too late and the wiper blades wipe in the dry state. The automatic wiper system accordingly works in an unsatisfactory manner.

SUMMARY OF THE INVENTION

The switching device, according to the invention, includes a control unit that generates a switch-on signal for the windshield wiper motor in response to increase in amplitude of the sensor signal above a predetermined threshold. The invention has the advantage that the wiper blades are switched off in a purposeful manner as soon as there is no additional moisture brought about by rain within the wiping area of the wiping blades on the windshield. Water remaining due to water streaks has no effect on the switching off, since the amplitude of the sensor signal remains constant when there are water streaks or decreases slowly and accordingly cannot contribute to maintaining the switch-on signal. The control unit required for the switching device can be integrated in an electronic wiper unit which is already present, e.g. for periodic wiping, at small additional expenditure.

BRIEF DESCRIPTION OF THE DRAWING

The invention is explained in more detail in the following description by means of an embodiment example shown in the drawing. The drawing shows a block wiring diagram of a device for rain-induced switching on and off of a windshield wiper motor.

DESCRIPTION OF THE EMBODIMENT PREFERRED

The switching device for the rain-induced switching on and off of an electric windshield wiper motor 10 shown in the wiring diagram comprises a switching relay 11 whose switching contact 12 is arranged in the electric circuit of the windshield wiper motor 10. The switching contact 12 can be arranged in series with the wiper switch 13 or the ignition switch which is to be actuated by hand and connects the windshield wiper motor 10 to the positive terminal $U_B$ of the vehicle battery.

The relay winding 14 of the switching relay 11 is connected to the output 15 of a control unit 16 whose input 17 is connected with the output of a so-called rain sensor 18. The rain sensor 18, which can be constructed in very different ways, supplies a sensor signal whose amplitude is dependent on the moisture on the windshield. The signal amplitude is directly proportional to the moisture on the windshield of the vehicle. The capacitive detector described in DE-OS 22 39 359, for example, can be used as a sensor 18; it comprises three electrodes which are arranged on the inside of the windshield in the wiping area of wiping blades in the arrangement shown there. While two electrodes are connected to an alternating voltage, the sensor signal is taken off at the third electrode.

The preferably digital control unit 16 is constructed in such a way that it detects the amplitude level of the sensor signal and generates a switch-on signal for the switching relay 11 when the amplitude magnitude is above a predetermined threshold amplitude level with respect to time. For this purpose, the control until 16 comprises an analog-to-digital converter 19, a comparator 20, a differentiator 21, a logical AND gate 22, a monostable multivibrator 23 and an amplifier 24. The analog-to-digital converter 19 is connected on the input side with the input 17 and on the output side with the comparator 20 on the one hand and the differentiator 21 on the other hand. A threshold value S is applied to the inverting input of the comparator 20. The comparator 20 generates a logical "H signal" when the output signal of the analog-to-digital converter 19, which lies at its noninverting input, is greater than the threshold S. The differentiator 21 generates a logical H signal as long as the instantaneous output digital valve of the analog-to-digital converter 19 is greater than the preceding one. The outputs of the comparator 20 and differentiator 21 are applied to the two inputs of the logical AND gate 22 whose output is connected with the input of the monostable multivibrator 23. The resetting time of the monostable multivibrator 23 is adjusted so as to be greater than the sampling clock period of the analog-to-digital converter 19, so that at least two consecutive digitized sampling values of the sensor signal can arrive as output signals of the AND gate 22 at the input of the monostable multivibrator 23 within the dwell time interval of the multivibrator 23 in its astable state. The Q output of the monostable multivibrator 23 is connected with the output 15 of the control unit 16 via the amplifier 24.

The windshield wiper switching device with control unit 16, rain sensor 18 and switching relay 11 operates as follows: If the wiper switch 13 or the ignition switch is closed and the windshield of the vehicle is rained upon, a relatively large signal amplitude of the sensor signal occurs at the input 17 of the control unit 16. The digitized value of this sensor signal at the output of the analog-to-digital converter 19 is accordingly greater than the threshold S, so that H signal is present at the output of the comparator 20. Since the moisture on the windshield increases within every wiping period as the rain increases and the signal amplitude of the sensor signal accordingly increases in every wiping period, a logical H signal also occurs at the output of the differentiator 21. The output of the AND gate 22 accordingly also assumes logical H, so that the monostable multivibrator 23 is set and H potential occurs at its Q output for the mentioned dwell interval. Exciting current accordingly reaches the exciting winding 14 via the amplifier 24 and the switching contact 12 closes, so that the windshield wiper motor 10 is switched on. As long as the rain persists, this switching state of the switching relay 11 does not change and the wiper motor 10 remains switched on.

As soon as the rain ceases to fall on the windshield, the wiping blades wipe the windshield dry. As a result of the absence of moisture, the amplitude of the sensor signal 18 becomes smaller than the predetermined threshold S. The output of the comparator 20 accordingly goes to logical L. The output of the AND gate 22 also becomes L, the triggering or setting of the monostable multivibrator 23 ceases, and the latter falls back into its basic stable state at which its Q output becomes logical L, so that the switching relay 11 is de-energized and the switching contact 12 opens. The windshield wiper motor 10 is disconnected from the supply voltage $U_B$.

When the wiping blades are not properly ordered, water streaks are often formed on the windshield which then still adhere to the windshield after the rain has ceased to fall on it. These water streaks cause a relatively large signal amplitude of the sensor signal which is greater than the threshold S. Since the sensor signal amplitude does not increase in the absence of rain, but remains constant or is even reduced, an L signal occurs at the output of the differentiator 21, the output of the AND gate 222 becomes logical L. The monoflop 23 is accordingly reset because of the absence of triggering, the switching relay 11 is de-energized in the same manner, and the windshield wiper motor 10 is likewise switched off. The prompt switching off of the windshield wiper motor 10 when the rain stops is accordingly ensured, regardless of whether or not a smaller or larger quantity of water streaks form on the windshield. This prompt switching off of the wiper motor 10 prevents the wiping blades from wiping in the dry state at least partially and prevents the rattling of the latter on the windshield which is associated with this.

I claim:

1. A device for rain-induced switching on and off of an electric windshield wiper motor in vehicles, comprising a rain sensor for generating a sensor signal with an amplitude level dependent on an amount of moisture on a windshield of a vehicle; an electrically controlled switch arranged in a power supply circuit of the windshield wiper motor; and a control unit for controlling the switch, said control unit comprising a comparator for receiving the sensor signal and for generating a first control signal when the amplitude level of the sensor signal exceeds a predetermined threshold value, a differentiator for receiving the sensor signal and for generating a second control signal when the amplitude level of the sensor signal increases within a predetermined time interval, and a logic gate for generating at its output, when both control signals occur simultaneously at its inputs, a switch-on signal applied to said switch.

2. A device set forth in claim 1, wherein said switch has a control input, said device further comprising a monostable multivibrator connected between the output of said logic gate and said control input of said switch for applying the switch-on signal thereto.

3. A device as set forth in claim 1, further comprising an analog-to-digital converter having an input for receiving the sensor signal and an output connected with inputs of said comparator and said differentiator for transmitting the sensor signal to said comparator and said differentiator.

* * * * *